(12) United States Patent
Roberts et al.

(10) Patent No.: US 8,975,555 B2
(45) Date of Patent: Mar. 10, 2015

(54) PROTECTIVE SHELL FOR A HAND HELD PLASMA CUTTING TORCH

(75) Inventors: Jesse Roberts, Cornish, NH (US); Peter Twarog, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 409 days.

(21) Appl. No.: 13/183,918

(22) Filed: Jul. 15, 2011

(65) Prior Publication Data

US 2012/0012566 A1 Jan. 19, 2012

Related U.S. Application Data

(60) Provisional application No. 61/365,088, filed on Jul. 16, 2010.

(51) Int. Cl.
| | |
|---|---|
| *B23K 10/00* | (2006.01) |
| *B23K 9/013* | (2006.01) |
| *B23K 10/02* | (2006.01) |
| *H05H 1/34* | (2006.01) |

(52) U.S. Cl.
CPC ............... *B23K 9/013* (2013.01); *B23K 10/00* (2013.01); *B23K 10/02* (2013.01); *H05H 1/34* (2013.01); *H05H 2001/3473* (2013.01)
USPC ............ 219/121.48; 219/121.59; 219/121.39; 219/137.31; 219/75

(58) Field of Classification Search
CPC ... H05H 1/34; H05H 2001/3473; B23K 10/02
USPC .............. 219/121.39, 121.48, 121.5, 121.51, 219/121.52, 74, 75, 121.36, 121.59, 219/137.31; 313/231.41, 231.51
See application file for complete search history.

(56) References Cited

U.S. PATENT DOCUMENTS

| | | | |
|---|---|---|---|
| 4,771,158 A | 9/1988 | Kleppen | |
| 4,788,401 A | 11/1988 | Kleppen | |
| 4,845,336 A * | 7/1989 | Samokovliiski et al. | .. 219/137.2 |
| 4,891,489 A | 1/1990 | Bollinger et al. | |
| 5,162,632 A | 11/1992 | Carkhuff | |
| 5,519,185 A | 5/1996 | Kleppen | |
| 5,681,489 A | 10/1997 | Carkhuff | |
| 6,172,334 B1 * | 1/2001 | Harris et al. | ................... 219/147 |
| 6,271,497 B1 * | 8/2001 | Zapletal | .................... 219/121.36 |
| 6,797,923 B2 | 9/2004 | Delgado et al. | |

(Continued)

FOREIGN PATENT DOCUMENTS

EP        0 810 053        12/1997

OTHER PUBLICATIONS

Application as filed for US D625,746 (U.S. Appl. No. 29/358,752, filed Mar. 31, 2010), 10 pages.

*Primary Examiner* — Mark Paschall
(74) *Attorney, Agent, or Firm* — Proskauer Rose LLP

(57) ABSTRACT

A protective shell for surrounding a portion of a body of a handheld plasma torch includes a first and second shell section. The plasma torch body includes a handle, a head extending from the handle and a torch tip extending from the head. The first shell section is structurally independent from an outer surface of the plasma torch body. The second shell section is structurally independent from the outer surface of the plasma torch body and is capable of being secured to the first shell section such that, in combination, the first and second shell sections surround the torch head and provide (i) structural protection to the torch head and (ii) thermal insulation to the torch head, wherein the first and second shell sections are electrically insulated relative to the torch head.

15 Claims, 4 Drawing Sheets

(56) References Cited

U.S. PATENT DOCUMENTS

| | | | |
|---|---|---|---|
| 7,241,972 B2* | 7/2007 | Kensrue | 219/137.2 |
| 7,244,909 B2* | 7/2007 | Kensrue et al. | 219/137.31 |
| D625,746 S | 10/2010 | Roberts | |
| 2004/0129691 A1 | 7/2004 | McTavish et al. | |
| 2009/0230096 A1 | 9/2009 | Haberler et al. | |
| 2009/0277892 A1 | 11/2009 | Achtner et al. | |

* cited by examiner

PROTECTIVE SHELL FOR A HAND HELD PLASMA CUTTING TORCH

RELATED APPLICATIONS

This application claims the benefit of and priority to U.S. Provisional Application No. 61/365,088, filed Jul. 16, 2010, the entirety of which is hereby incorporated herein by reference.

TECHNICAL FIELD

The present invention relates generally to plasma arc cutting torches, and more particularly, to a heat shield for a hand held plasma cutting torch.

BACKGROUND

Welding and plasma arc torches are widely used in the welding, cutting, and marking of materials. A plasma torch generally includes an electrode, and a nozzle having a central exit orifice mounted within a torch body, electrical connections, passages for cooling, passages for arc control fluids (e.g., plasma gas), and a power supply. A swirl ring can be employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

Hand held plasma arc torches generally include a plastic exterior housing surrounding at least a portion of the torch to safely insulate the operator from dangerous power (for example, 170 V/100 Amps). However, plasma cutting torches are intended to cut metal, which inherently has a higher melting temperature than the plastic housings of plasma arc torches. Thus, over time, the plastic housing does not hold up due to the environment in general, and the high temperature cutting environment, in particular. In addition, the plastic can become embrittled and susceptible to cracking with repeated impact events (for example, if the torch is accidently dropped or improperly used as a hammer).

SUMMARY OF THE INVENTION

What is needed is an electrically insulating shell for providing a plasma torch head with more robustness against molten spatter, dropping impact, UV light, and heat. An insulating shell covering the torch head and/or handle can enhance the robustness and improve the visual image of the torch.

In one aspect, the invention features a protective shell for surrounding a portion of a body of a handheld plasma torch. The plasma torch body includes a handle, a head extending from the handle and a torch tip extending from the head. The protective shell includes a first shell section that is structurally independent from an outer surface of the plasma torch body and a second shell section that is structurally independent from the outer surface of the plasma torch body. The second shell section is capable of being secured to the first shell section such that, in combination, the first and second shell sections surround the torch head and provide (i) structural protection to the torch head and (ii) thermal insulation to the torch head, wherein the first and second shell sections are electrically insulated relative to the torch head.

In another aspect, the invention features a method of enhancing structural and thermal protection of a body of a handheld plasma torch. The plasma torch body includes a handle, a head extending from the handle and a torch tip extending from the head. A first shell section is secured to a second shell section such that a combination of the first and second shell sections surrounds the torch head. Each section is structurally independent and electrically insulated from the torch body. Structural protection and thermal insulation is provided to the torch head, via the first and second shell sections.

In some embodiments, the first and second shell sections, in combination, surround at least a portion of the handle. The first and second shell sections, in combination, can surround at least a portion of the torch tip. The first and second shell sections can be formed of a metal material that is electrically conductive. In some embodiments, the first and second shell sections, in combination, are electrically coupled to a fault switch.

The protective shell can also include an insulating means disposed on a surface of at least one of the first and second shell sections. The insulating means can provide electrical insulation relative to the torch head. The insulating means can be, for example, a powder coating, paint, or a dielectric coating. In some embodiments, the protective shell includes a coating dispersed on an outer surface of the first and second shell sections. The coating can provide electrical insulation relative to the torch head.

In some embodiments, the protective shell also includes a connector portion on at least one of the first or second shell sections. The connector portion can be capable of receiving torch attachments. The torch attachments can include at least one of a wire brush, a mallet, a hanging hook, a bevel guide, a finger shield, or a scraper.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
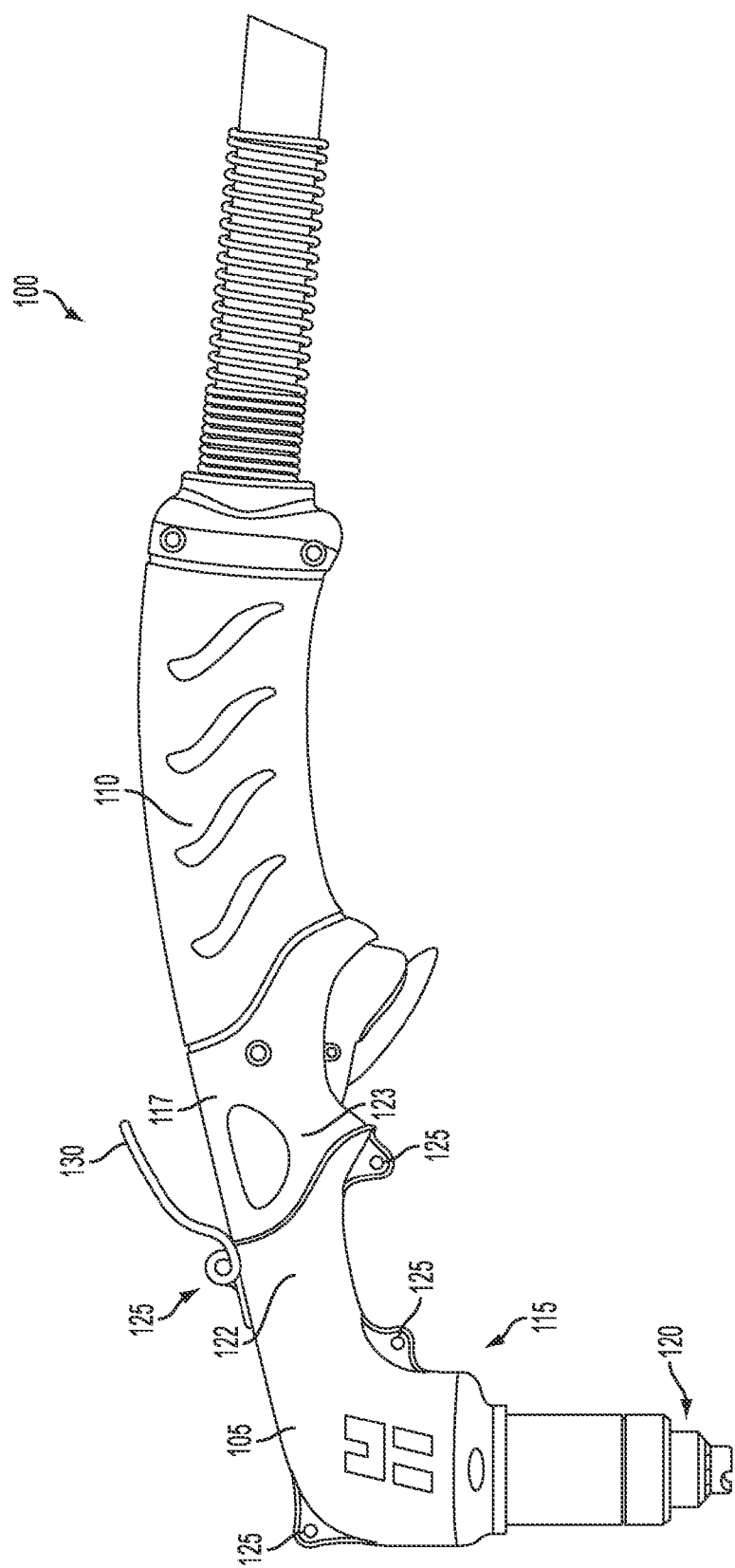
FIG. 1 is a side view of a plasma arc torch having a protective shell, according to an illustrative embodiment of the invention.

FIG. 1 shows a plasma arc torch 100 having a protective shell 105. The plasma arc torch 100 includes a handle 110, a head 115, a torch body 117, and a torch tip 120. The head 115 extends from the handle 110 and the torch tip 120 extends from the head 115. The plasma torch tip 120 can include a variety of different consumables including, for example, an electrode, nozzle, retaining cap, shield and/or swirl ring. The torch 100 and torch tip 120 can include electrical connections, passages for cooling, and passages for arc control fluids (e.g., plasma gas).

The protective shell 105 can be formed from two separate shell sections, for example, a first shell section 122 and a second shell section (not shown in FIG. 1, but see, e.g., the shell sections 200 and 205 of FIGS. 2A and 2B) located opposite to the first shell section. The first and second shell sections 122 can be structurally independent from an outer surface of the plasma torch body 117 (e.g., when first and second shell sections 122 are removed from the plasma arc torch, the torch can be operated in the same manner as when the protective shell surrounds the torch). For example, the body 117 of the plasma arc torch 100 can have an outer surface 123. The first and second shell sections 122 can be positioned such that, in combination, the shell sections surround at least a portion of the plasma arc torch 100, for example, the shell sections can surround at least a portion of the torch head 115, at least a portion of the handle 110, or at least a portion of the torch tip 120. In some embodiments, the protective shell 105 surrounds one or more of the torch head 115, handle 110 and/or the torch tip 120.

The second shell section is capable of being mated with and/or secured to the first shell section 122 to form an assembled protective shell 105. The protective shell is not secured to the plasma arc torch 100, and is thus structurally independent from the plasma arc torch. For example, the second shell section can be secured to the first shell section 122 using fasteners (e.g., screws and/or clips) in multiple locations 125. This provides the shell sections with structural independence from the outer surface 123 of the plasma torch body 117. The two shell sections can be removed by unsecuring (e.g., removing the fasteners, screws and/or clips) to replace or repair the protective shell 105. When the structurally independent protective shell 105 is removed from the plasma arc torch, the plasma arc torch is fully functional.

The protective shell 105 can insulate the plasma arc torch head, handle, and/or torch tip from the surrounding environment by acting as a barrier between the plasma arc torch and the surrounding environment. The protective shell can enhance the structural and thermal protection of a body of a handheld plasma torch. For example, the protective shell 105 can insulate the plasma arc torch from impact, molten spatter, UV light, and heat.

The protective shell 105 provides structural protection to the torch head, handle, and/or torch tip, depending on what portion of the plasma arc torch the protective shell 105 is covering. For example, if the plasma arc torch is accidently dropped or knocked against another object, the protective shell 105 can provide protection to the plasma arc torch and can minimize the damage that can occur to the plasma arc torch when it is dropped or knocked against another object. The protective shell 105 can absorb or sustain the impact and any structural damage instead of the torch sustaining the damage. If the protective shell 105 becomes damaged (e.g., cracked), the protective shell 105 can be removed from the plasma arc torch and a new protective shell can be installed. This reduces the cost associated with operating the plasma arc torch because the less expensive protective shell can be replaced when damaged instead of having to replace the more expensive torch. This can also lead to the plasma arc torch with a protective shell 105 having an extended life as compared to a plasma arc torch without a protective shell 105.

The protective shell 105 can also protect the plasma arc torch from molten spatter buildup. When the plasma arc torch is being used to cut a workpiece, melted metal from the workpiece can accumulate on the plasma arc torch, for example, on the torch tip. This accumulation can cause the plasma arc torch to wear prematurely. When the protective shell 105 is used with the plasma arc torch, the molten spatter can accumulate on the protective shell 105 instead of on the torch itself (e.g., instead of on the torch tip). The protective shell 105 can be replaced when there is too much molten spatter buildup for the torch to operate properly. Thus the protective shell 105 shields the torch from any or a majority of molten spatter buildup. This can lead to the plasma arc torch with a protective shell 105 having an extended life as compared to a plasma arc torch without a protective shell 105.

The protective shell 105 can also provide protection against UV light to the torch head, handle, and/or torch tip, depending on what portion of the plasma arc torch the protective shell 105 is covering. UV light can cause premature embrittlement of a plastic protective shell making the protective shell more susceptible to breaking during an impact event. For example, the protective shell 105 can reflect UV light, thus preventing any damage the UV light could cause to the plasma arc torch.

The protective shell 105 can also provide thermal insulation to the torch head, handle, and/or torch tip, depending on what portion of the plasma arc torch the protective shell 105 is covering. Plasma arc torches are operated at extremely high temperatures, for example about 15,000 degrees Celsius. The high operating temperature can cause damage to the plasma arc torch. A protective shell 105 can provide thermal insulation but absorbing the heat from the operation of the torch (or the heat from the environment in general) instead of the heat being absorbed by the plasma arc torch. This can lead to the plasma arc torch with a protective shell 105 having an extended life as compared to a plasma arc torch without a protective shell 105.

In some embodiments, the protective shell 105 includes a connector portion 130 on at least one of the first or second shell sections 122. The connector portion can be on the first shell section or the second shell section (e.g., the first shell section 200 or the second shell section 205 of FIGS. 2A and 2B, respectively). In some embodiments, there are multiple connector portions 130 on the first and/or second shell sections.

The connector portion 130 is capable of receiving torch attachments. The torch attachments can includes, for example, at least one of a wire brush, a mallet, a hanging hook, a bevel guide, a finger shield, or a scraper. Multiple attachments can be disposed on a single connector portion 130. In some embodiments, there are multiple connector portions 130 and each connector portion receives a single attachment.

In some embodiments, a connector portion is not disposed on the protective shell and is instead disposed directly on the torch body 117, the torch head 115, and/or the torch handle 110. The connector portion can be removably coupled to the torch body 117, the torch head 115, and/or the torch handle 110, for example, by a removable fastener (e.g., a screw or a clip). In some embodiments, the connector portion is permanently coupled to the torch body 117, the torch head 115, and/or the torch handle 110. When the connector portion is not disposed on the protective shell, the protective shell can be removed and/or replaced without having to remove all of the attachments prior to removal or the protective shell.

In some embodiments, the attachments can be disposed on the torch body 117, the torch head 115, and/or the torch handle 110, for example, without a connector portion. The attachments can be secured to the torch body 117, the torch head 115, and/or the torch handle 110 by a fastener (e.g., a screw or a clip).

Figure 2A:
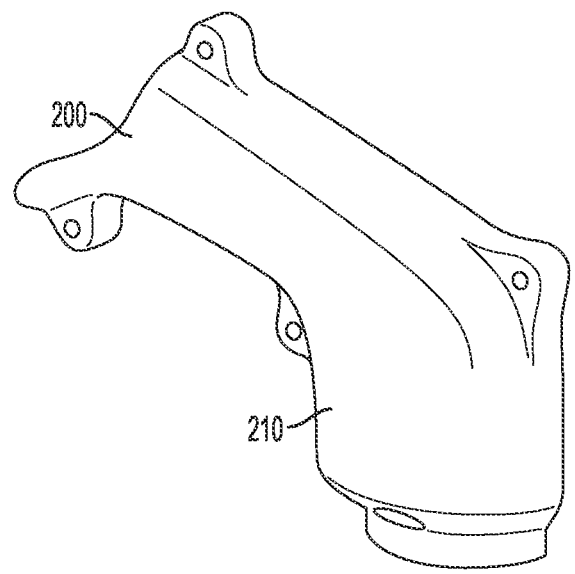
FIG. 2A is a side view of one half of a protective shell for a plasma arc torch, according to an illustrative embodiment of the invention.
Figure 2B:
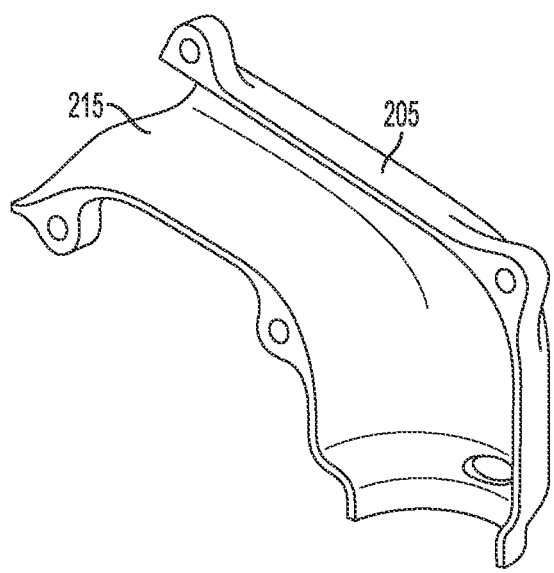
FIG. 2B is a side view of one half of a protective shell for a plasma arc torch, according to an illustrative embodiment of the invention.

FIGS. 2A and 2B show side views of the first shell section 200 and the second shell section 205, respectively. The first and second shell sections 200, 205 can have an exterior surface 210 and an interior surface 215. The interior surface 215 of the first and second shell sections 200, 205 can be contoured to securely wrap around a torch. For example, the interior surface 215 of the first and second shell sections 200, 205 can be contoured such that the interior surface 215 conforms to the exterior surface of a torch body.

The first and second shell sections 200, 205 can be made from a variety of materials. For example, a plastic material can be used to form the first and second shell sections 200, 205. Plastic offers several advantages, includes, for example, that it is inexpensive. A plastic, removable, protective shell can be easily and inexpensively replaced if it wears out. Furthermore, a plastic protective shell provides electrical protection and insulation against voltage concerns.

The first and second shell sections 200, 205 can also be formed of a metal material that is electrically conductive. An advantage of using metal is its durability against heat. The metal can be formed from a sheet metal process (for example, stamping), plating processes or casting processes. A cast zinc alloy can be used because of its high impact strength and economical production.

Figure 3:
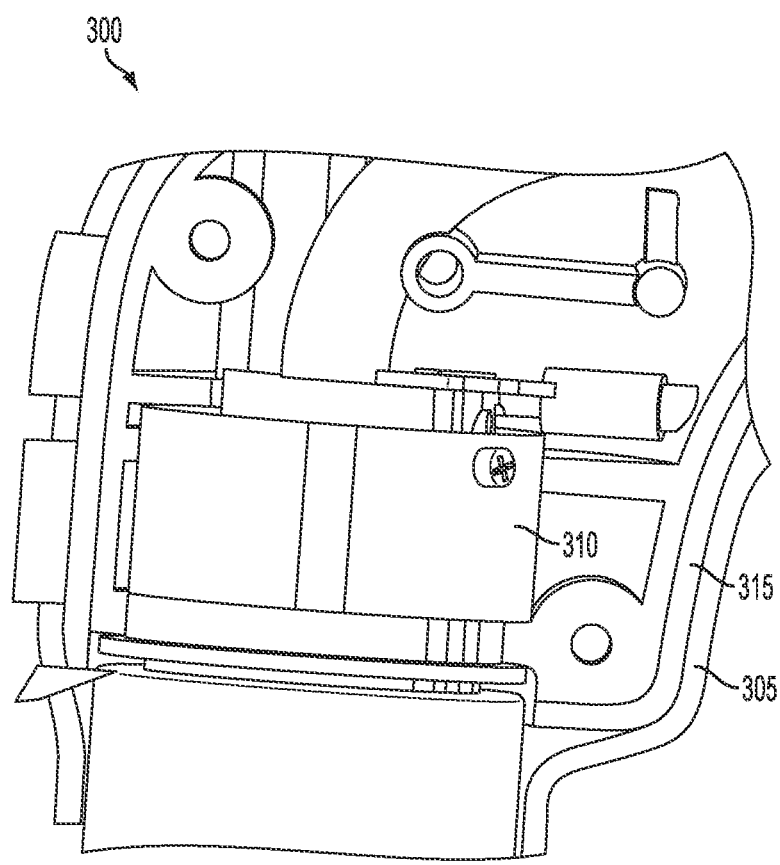
FIG. 3 is a cross-sectional view of a plasma torch head with a protective shell, according to an illustrative embodiment of the invention.

Although a metal protective shell has many advantages, it is technically difficult to execute because the metal of the protective shield can conduct potentially hazardous electricity from the torch to an operator. However, there are several methods that can be used to protect the protective shell from hazardous power inside the plasma torch handle (e.g., there are several methods that can be used to made the protective shell electrically insulated from the torch body). A coating, for example a powder coating, can be dispersed on the exterior surface 210 of the first and second shell sections 200, 205. The coating provides electrical insulation relative to the torch head and provides a layer of safety from voltage. For example, the coating can have dielectric properties that can prevent voltage from being transferred from the plasma arc torch to the operator. A ceramic paint can be used to provide electrical isolation of the metal protective shell. In addition, the metal protective shell can be dielectrically overlapped with the underlying plastic housing to provide protection from the hazardous voltage inside the plasma arc torch FIG. 3 shows a cross-sectional view of a plasma torch head 300 with a protective shell 305. The torch body assembly 310 is made of metal and operates at a hazardous voltage. To avoid this hazardous voltage from transferring from the torch body assembly 310 to the protective shell 305, and eventually to an operator, the metal protective shell 305 can be dielectrically overlapped with an underlying plastic housing 315 so that the voltage from the torch body assembly 310 is not transferred to an operator through the metal protective shell 305. The underlying plastic housing 315 is a poor conductor of electricity and thus the hazardous voltage will not be transferred from the metal torch body assembly 310 to the plastic housing 315 and ultimately to the protective shell 305 and operator. The plastic housing 315 can have a ridge that protrudes (e.g., out of plane of the paper) into a groove located in a second half of the protective shell to provide a dielectric overlap.

In some embodiments, the protective shell includes an insulating means disposed on a surface of at least one of the first and second shell sections to avoid hazardous voltage from transferring from the torch body assembly 310 to the protective shell 305. For example, referring to FIG. 2, the insulating means can be disposed on the interior surface 215 of the first and/or second shell sections 200, 205. The insulating means can provide electrical insulation relative to the torch head, for example, relative to the torch body assembly 310 of FIG. 3. The insulating means, can be, for example, a powder coating, paint, a dielectric coating, or a separate insulating part that caps key areas of the shell.

As a safety precaution when the first and second shell sections are formed of metal, the first and second shell sections, in combination, can be coupled to a fault switch (not shown). For example, the fault switch can turn off the plasma arc torch if the voltage to the protective shell is above a certain level, for example about 45V, 48V, or 50V.=

Figure 4:
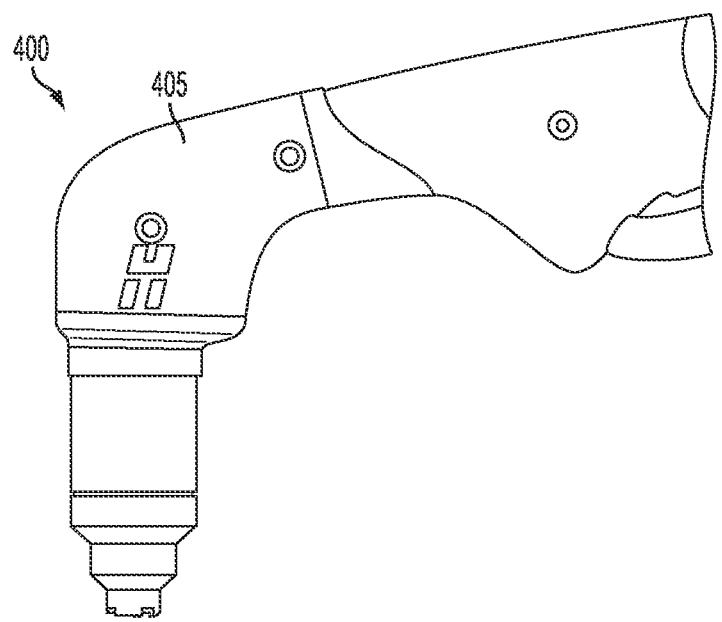
FIG. 4 is a side view of a plasma arc torch having an integrally formed protective shell, according to an illustrative embodiment of the invention.

FIG. 4 shows a side view of a plasma arc torch 400 having an integrally formed protective shell 405. An integrally formed protective shell 405 can provide a slimmer overall profile, allowing an operator to access a narrow location, and can require fewer fasteners than a non-integrally formed protective shell (e.g., protective shell 105 of FIG. 1). The integrally formed protective shell 405 can insulate the plasma arc torch from impact, molten spatter, UV light, and heat, similar to that of the non-integrally formed protective shell 105 of FIG. 1. For example, the shell could be insert molded into the plastic housing.

Although various aspects of the disclosed apparatus and method have been shown and described, modifications may occur to those skilled in the art upon reading the specification. The present application includes such modifications and is limited only by the scope of the claims.

What is claimed is:

1. A protective shell for surrounding a portion of a body of a handheld plasma torch, the plasma torch body including a handle, a head extending from the handle and a torch tip extending from the head, the protective shell comprising:
    a first removable shell section that is positioned to surround at least an electrically non-conductive portion of an outer surface of the plasma torch body; and
    a second removable shell section that is positioned to surround at least a portion of the outer surface of the plasma torch body, wherein the second shell is capable of being secured to the first shell section such that, in combination, the first and second shell sections surround at least the torch head and provide
    (i) structural protection to the torch head; and
    (ii) thermal insulation to the torch head;
    wherein the first and second shell sections are electrically insulated relative to the torch head and are arranged such that the plasma torch remains operable in an event the first and second shells are removed.

2. The protective shell of claim 1 wherein the first and second shell sections, in combination, surround at least a portion of the handle.

3. The protective shell of claim 1 wherein the first and second shell sections, in combination, surround at least a portion of the torch tip.

4. The protective shell of claim 1 wherein the first and second shell sections are formed of a metal material that is electrically conductive.

5. The protective shell of claim 1 further comprising an insulating means disposed on a surface of at least one of the first and second shell sections, the insulating means providing electrical insulation relative to the torch head.

6. The protective shell of claim 1 further comprising a coating dispersed on an outer surface of the first and second shell sections, the coating providing electrical insulation relative to the torch head.

7. The protective shell of claim 1 further comprising a connector portion on at least one of the first or second shell sections, the connector portion capable of receiving torch attachments.

8. The protective shell of claim 7 wherein the torch attachments include at least one of a wire brush, a mallet, a hanging hook, a bevel guide, a finger shield, or a scraper.

9. The protective shell of claim 1 wherein the first and second shell sections, in combination, are electrically coupled to a fault switch.

10. A method of enhancing structural and thermal protection of a body of a handheld plasma torch, the plasma torch body having an electrically non-conductive surface and including a handle, a head extending from the handle, and a torch tip extending from the head, the method comprising:

securing a first removable shell section, positioned to surround at least a portion of an outer surface of the plasma torch body, to a second removable shell section, positioned to surround at least a portion of the outer surface of the plasma torch body, such that a combination of the first and second removable shell sections conform to the outer surface of the plasma torch body and surround at least the torch head, each section being electrically insulated from the torch body; and providing to the torch head, via the first and second shell sections (i) structural protection and (ii) thermal insulation.

11. The method claim 10 wherein the first and second shell sections, in combination, surround at least a portion of the handle.

12. The method claim 10 wherein the first and second shell sections, in combination, surround at least a portion of the torch tip.

13. The method claim 10 wherein the first and second shell sections are formed of a metal material that is electrically conductive.

14. The method of claim 10 wherein the first and second shell sections have a coating dispersed on an outer surface thereof, the coating providing electrical insulation relative to the torch head.

15. The method of claim 10 wherein the first and second shell sections are arranged such that the plasma torch remains operable in an event the first and second shells are removed.

\* \* \* \* \*